(12) United States Patent
Maenishi et al.

(10) Patent No.: US 12,023,842 B2
(45) Date of Patent: Jul. 2, 2024

(54) RESIN-FILM MANUFACTURING APPARATUS AND ITS CONTROL METHOD

(71) Applicant: THE JAPAN STEEL WORKS, LTD., Tokyo (JP)

(72) Inventors: Ryuichiro Maenishi, Tokyo (JP); Soma Tanaka, Tokyo (JP)

(73) Assignee: THE JAPAN STEEL WORKS, LTD., Tokyo (JP)

( * ) Notice: Subject to any disclaimer, the term of this patent is extended or adjusted under 35 U.S.C. 154(b) by 403 days.

(21) Appl. No.: 17/407,148

(22) Filed: Aug. 19, 2021

(65) Prior Publication Data
US 2022/0072756 A1    Mar. 10, 2022

(30) Foreign Application Priority Data
Sep. 9, 2020   (JP) ................................ 2020-151565

(51) Int. Cl.
*B29C 48/92*    (2019.01)
*B29C 48/08*    (2019.01)
(Continued)

(52) U.S. Cl.
CPC .............. *B29C 48/92* (2019.02); *B29C 48/08* (2019.02); *B29C 48/313* (2019.02); *B29C 48/914* (2019.02); *C08J 5/18* (2013.01); *G05B 6/02* (2013.01); *G05B 13/0265* (2013.01); *B29C 2948/92152* (2019.02);
(Continued)

(58) Field of Classification Search
CPC ....... B29C 48/92; B29C 48/08; B29C 48/313; B29C 48/914; B29C 2948/92152; B29C 2948/92447; B29C 2948/92647; B29C 2948/92704; B29C 2948/92904; B29C 2948/92923; B29C 2948/92628;
(Continued)

(56) References Cited

U.S. PATENT DOCUMENTS

2003/0050717 A1*  3/2003  Hirata .................. G05B 13/048
                                                            264/239
2021/0200198 A1*  7/2021  Tokuno .............. G05B 13/0265

FOREIGN PATENT DOCUMENTS

JP    H01-314135 A    12/1989
JP    2003-089146 A    3/2003
(Continued)

OTHER PUBLICATIONS

Decision to Grant issued Apr. 2, 2024, in Japanese Patent Application No. 2020-151565.

*Primary Examiner* — Charles Cai
(74) *Attorney, Agent, or Firm* — Potomac Law Group, PLLC

(57) ABSTRACT

In a resin-film manufacturing apparatus of an embodiment, when a lip gap control is started, a difference between a state of a target heat bolt (THB) at a start of current control and a state of each of all the heat bolts at a start of last control is obtained, when the difference between the states of THB at the starts of the current and last control is a smallest one, a learning result of THB is set as an initial value of a control condition for THB, and when the difference between the states of THB is not the smallest one, either one of a learning result of the heat bolt of which the difference between the states is smaller than the difference between the states of THB and the learning result of THB is set as the initial value of the control condition for THB.

12 Claims, 8 Drawing Sheets

(51) Int. Cl.
*B29C 48/31* (2019.01)
*B29C 48/88* (2019.01)
*C08J 5/18* (2006.01)
*G05B 6/02* (2006.01)
*G05B 13/02* (2006.01)

(52) U.S. Cl.
CPC ............... *B29C 2948/92447* (2019.02); *B29C 2948/92647* (2019.02); *B29C 2948/92704* (2019.02); *B29C 2948/92904* (2019.02); *B29C 2948/92923* (2019.02); *C08J 2300/20* (2013.01)

(58) Field of Classification Search
CPC .......... B29C 48/31; B29C 48/865; C08J 5/18; C08J 2300/20; G05B 6/02; G05B 13/0265
See application file for complete search history.

(56) References Cited

FOREIGN PATENT DOCUMENTS

| | | |
|---|---|---|
| JP | 2004-284128 A | 10/2004 |
| JP | 2006-021413 A | 1/2006 |
| JP | 2010-167584 A | 8/2010 |
| JP | 2012-240332 A | 12/2012 |
| JP | 2013-039677 A | 2/2013 |
| JP | 2013-052574 A | 3/2013 |

* cited by examiner

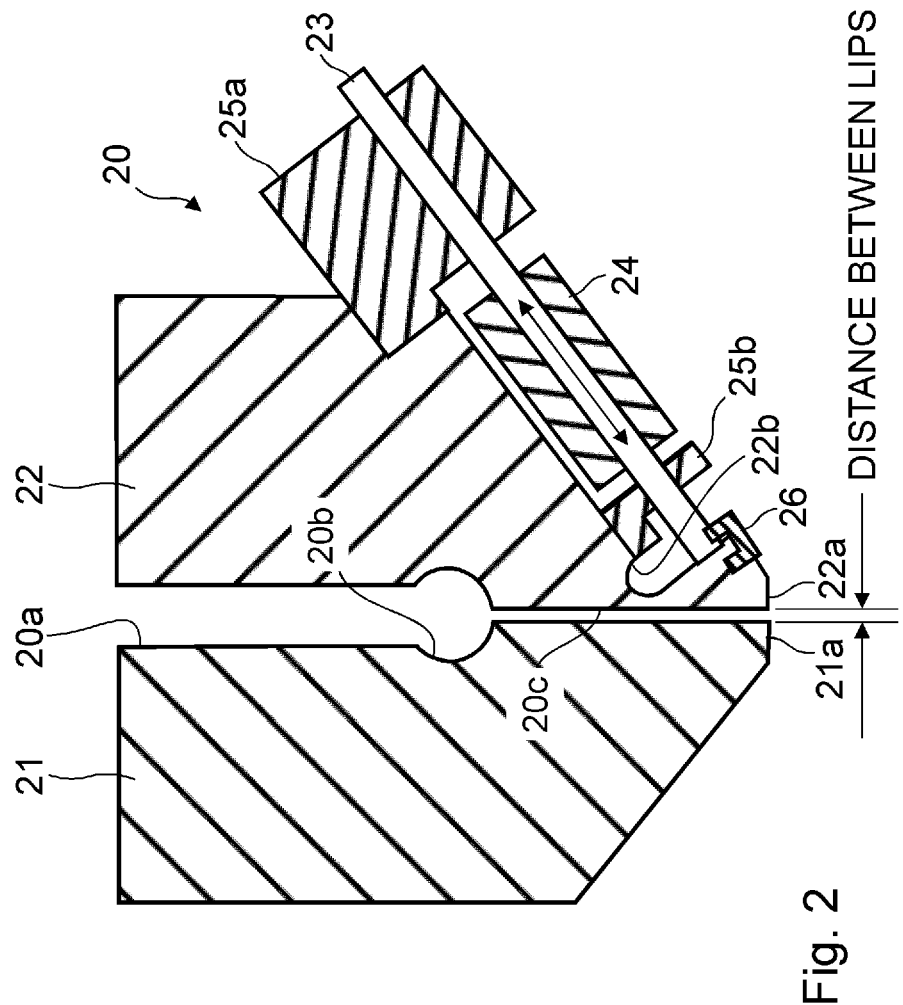
Fig. 2
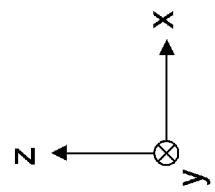

RESIN-FILM MANUFACTURING APPARATUS AND ITS CONTROL METHOD

INCORPORATION BY REFERENCE

This application is based upon and claims the benefit of priority from Japanese patent application No. 2020-151565, filed on Sep. 9, 2020, the disclosure of which is incorporated herein in its entirety by reference.

BACKGROUND

The present disclosure relates to a resin-film manufacturing apparatus and its control method.

A resin-film manufacturing apparatus in which a film-like molten resin is extruded from a gap between lips of a die connected to an extruder has been known. In such a resin-film manufacturing apparatus, it has been desired to make the thickness of the resin film uniform in the width direction thereof.

Therefore, in each of dies disclosed in Japanese Unexamined Patent Application Publication Nos. 2010-167584, 2012-240332, and 2013-052574, a plurality of heat bolts arranged along the longitudinal direction of lips (i.e., in the width direction of a resin film) are provided. It is possible to locally adjust the distance between lips (i.e., the lip gap) of the die by individually controlling the amount of the thermal expansion of each heat bolt by using a heater.

Further, Japanese Unexamined Patent Application Publication No. 2013-039677 discloses a resin-film manufacturing apparatus capable of measuring the thickness of a resin film during the manufacturing thereof, and thereby performing feedback control for the distance between lips of a die.

SUMMARY

The inventors have found various problems during the development of a resin-film manufacturing apparatus that includes a die including a plurality of heat bolts, and is capable of performing feedback control for the distance between lips of the die.

Other problems and novel features will be clarified from the descriptions in this specification and the attached drawings.

In a resin-film manufacturing apparatus according to an embodiment, when control of a distance between lips is started, for each of heat bolts, a difference between a state of a target heat bolt at a start of current control and a state of each of all the heat bolts at a start of last control is obtained, when the difference between the states of the target heat bolt at the starts of the current and last control is a smallest one, a learning result of the target heat bolt is set (i.e., used) as an initial value of a control condition for the target heat bolt, and when the difference between the states of the target heat bolt is not the smallest one, either one of a learning result of the heat bolt of which the difference between the states is smaller than the difference between the states of the target heat bolt and the learning result of the target heat bolt is set (i.e., used) as the initial value of the control condition for the target heat bolt.

According to the above-described embodiment, it is possible to provide a manufacturing apparatus capable of manufacturing an excellent resin film.

The above and other objects, features and advantages of the present disclosure will become more fully understood from the detailed description given hereinbelow and the accompanying drawings which are given by way of illustration only, and thus are not to be considered as limiting the present disclosure.

BRIEF DESCRIPTION OF DRAWINGS

FIG. 2 is a cross-cross-sectional view of a T-die 20;

DESCRIPTION OF EMBODIMENTS

Specific embodiments are explained hereinafter in detail with reference to the drawings. However, the present disclosure is not limited to the below-shown embodiments. Further, the following descriptions and the drawings are simplified as appropriate for clarifying the explanation.

First Embodiment

<Overall Configuration of Resin-Film Manufacturing Apparatus>

Figure 1:
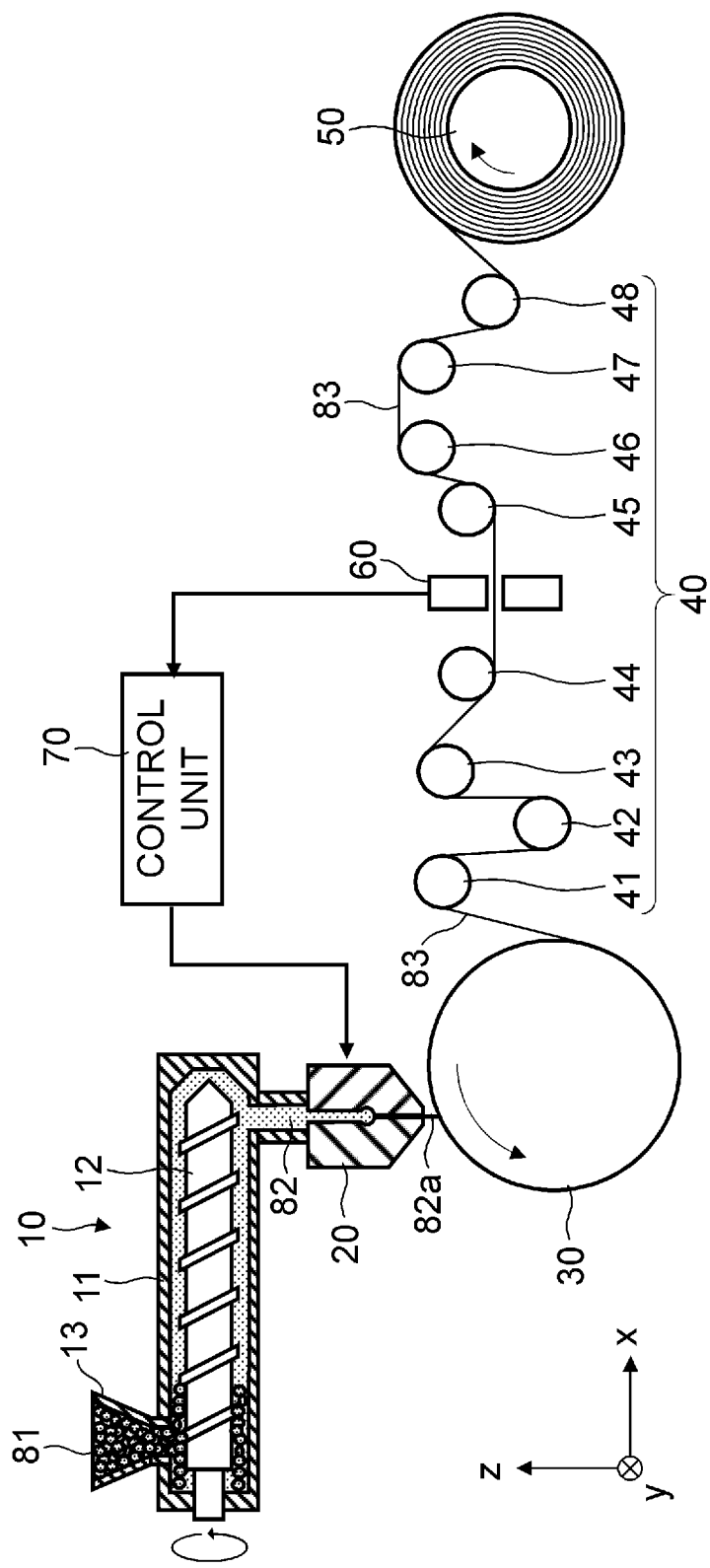
FIG. 1 is a schematic cross-sectional view showing the overall configuration of a resin-film manufacturing apparatus and a resin-film manufacturing method according to a first embodiment.

Firstly, the overall configuration of a resin-film manufacturing apparatus and a resin-film manufacturing method according to a first embodiment will be described with reference to FIG. 1. FIG. 1 is a schematic cross-sectional view showing the overall configuration of the resin-film manufacturing apparatus and the resin-film manufacturing method according to the first embodiment.

Note that, needless to say, right-handed xyz-orthogonal coordinates shown in FIG. 1 and other drawings are shown for the sake of convenience for explaining the positional relation among components. In general, the z-axis positive direction is the vertically upward direction and the xy-plane is a horizontal plane throughout the drawings.

Further, in this specification, the term "resin film" includes a resin sheet. As shown in FIG. 1, the resin-film manufacturing apparatus according to the first embodiment includes an extruder 10, a T-die 20, a cooling roll 30, a group of conveyor rolls (hereinafter also referred to as a conveyor roll group) 40, a winder 50, a thickness sensor 60, and a control unit 70. The resin-film manufacturing apparatus according to the first embodiment is an extrusion-molding type resin-film manufacturing apparatus in which a film-like molten resin 82a is extruded from a gap between lips of the T-die 20 connected to the extruder 10.

The extruder 10 is, for example, a screw-type extruder. In the extruder 10 shown in FIG. 1, a screw 12 extending in the x-axis direction is housed in a cylinder 11 extending in the x-axis direction. A hopper 13 for charging resin pellets 81, which are a raw material for a resin film 83, is provided over the upper side of the cylinder 11 near the end thereof located on the negative side in the x-axis direction.

The resin pellets 81 supplied from the hopper 13 are extruded (i.e., pushed) from the base of the rotating screw 12 toward the tip thereof, i.e., extruded (i.e., pushed) in the x-axis positive direction. The resin pellets 81 are compressed by the screw 12, which is rotating inside the cylinder 11, and are transformed into molten resin 82.

Note that although it is not shown in the drawings, for example, a motor is connected, as a driving source, to the screw 12 through a speed reducer.

As shown in FIG. 1, the T-die 20 is connected to the lower side of the extruder 10 near the distal end thereof (the end on the positive side in the x-axis direction). The film-like molten resin 82a is extruded downward (in the z-axis negative direction) from the gap between the lips of the T-die 20 located at the lower end thereof. Note that the distance between the lips (hereinafter also referred to as the lip distance) of the T-die 20 is adjustable. As will be described later in detail, the lip distance of the T-die 20 can be adjusted at a plurality of places along the longitudinal direction of the lips (in the y-axis direction) so that the thickness of the manufactured resin film 83 becomes uniform in the width direction thereof (in the y-axis direction).

The cooling roll 30 discharges the resin film 83, which is formed as the film-like molten resin 82a solidifies, while cooling the film-like molten resin 82a extruded from the T-die 20. The resin film 83 discharged from the cooling roll 30 is conveyed through the conveyor roll group 40 and is wound up by the winder 50. In the example shown in FIG. 1, the conveyor roll group 40 includes eight conveyor rolls 41 to 48. The number and arrangement of conveyor rolls are determined as desired.

The thickness sensor 60 is, for example, a noncontact-type thickness sensor and measures the distribution of thicknesses (hereinafter also referred to as the thickness distribution) of the resin film 83, which was discharged from the cooling roll 30 and is being conveyed, in the width direction thereof. In the example shown in FIG. 1, the thickness sensor 60 is disposed so as to vertically sandwich the resin film 83, which is being conveyed in the horizontal direction, between the conveyor rolls 44 and 45. Since the thickness sensor 60 is the noncontact type, it can be scanned (i.e., moved) in the width direction of the resin film 83 (in the y-axis direction). Therefore, it is possible to measure the thickness distribution of the resin film 83 in the width direction thereof by using a compact thickness sensor 60. Further, since the resin film 83 is conveyed in the horizontal direction, the thickness distribution can be accurately measured even when the thickness sensor 60 is scanned (i.e., moved).

The control unit 70 controls a heater 24 based on the thickness distribution of the resin film 83 acquired from the thickness sensor 60, and by doing so, learns a control condition for the heater 24 while performing feedback control for the lip distance of the T-die 20. More specifically, the control unit 70 controls the lip distance of the T-die 20 so that the thickness of the resin film 83 becomes uniform in the width direction thereof. Note that the configuration and the operation of the control unit 70 will be described later in a more detailed manner.

<Configuration of T-Die 20>

The structure of the T-die 20 will be described hereinafter in a more detailed manner with reference to FIGS. 2 and 3.

FIG. 2 is a cross-sectional view of the T-die 20. Further, FIG. 3 is a partial perspective view of the lower side (the lip side) of the T-die 20.

Figure 3:
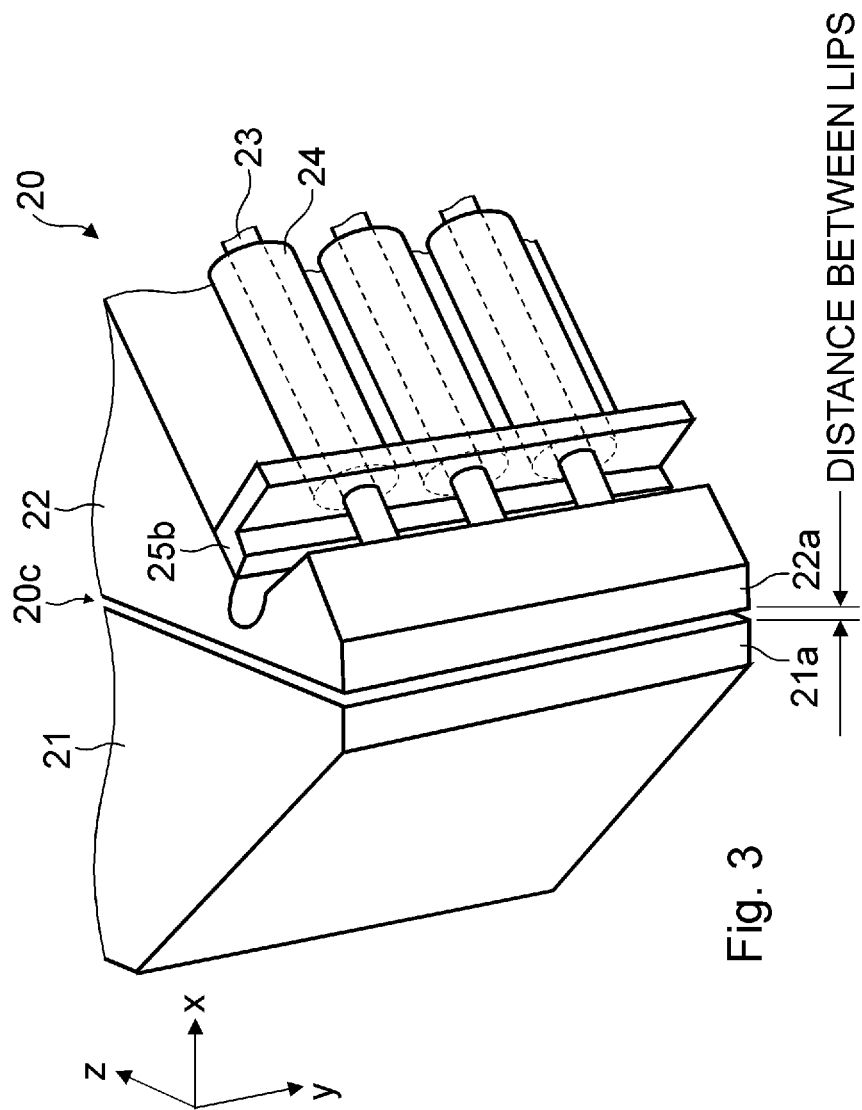
FIG. 3 is a partial perspective view of a lower side (a lip side) of the T-die 20.

As shown in FIGS. 2 and 3, the T-die 20 is composed of a pair of die blocks 21 and 22 that are arranged so as to abut against each other. In each of the pair of die blocks 21 and 22, which are arranged so as to abut against each other, a tapered part that is inclined downward from the outer-side surface toward the inner-side surface (the abutting surface) is formed. That is, thin lips 21a and 22a are provided at the lower ends of the abutting surfaces of the die blocks 21 and 22, respectively.

In the abutting surfaces of the pair of die blocks 21 and 22, an inlet port 20a, a manifold 20b, and a slit 20c are formed. The inlet port 20a extends downward (in the z-axis negative direction) from the upper surface of the T-die 20. The manifold 20b extends from the lower end of the inlet port 20a in the y-axis positive direction and the y-axis negative direction. In this way, the inlet port 20a and the manifold 20b are formed in a T-shape in the T-die 20.

Further, the slit 20c extending from the bottom surface of the manifold 20b to the lower surface of the T-die 20 extends in the y-axis direction. The molten resin 82 is extruded downward from the slit 20c (i.e., from the gap between the lips 21a and 22a) through the inlet port 20a and the manifold 20b.

Note that while the lip 21a is a fixed stationary lip, the lip 22a is a movable lip connected to heat bolts 23. In the lip 22a, a cut-out groove 22b is formed so as to extend obliquely upward from the outer-side surface toward the abutting surface. The lip 22a is pushed and pulled by the heat bolts 23, so that the lip 22a can be moved by using the bottom of the cut-out groove 22b as a fulcrum. As described above, only the lip 22a is formed as a movable lip, so that the lip distance can be easily adjusted by a simple structure.

The heat bolts 23 extend obliquely upward along the tapered part of the die block 22. The heat bolts 23 are supported by holders 25a and 25b fixed to the die block 22. More specifically, the heat bolts 23 are screwed into threaded holes formed in the holder 25a. The tightness of each of the heat bolts 23 can be adjusted as desired. In contrast, although the heat bolts 23 are inserted through through-holes formed in the holder 25b, they are not fixed to the holder 25b. Note that the holders 25a and 25b do not necessarily have to be formed as components that are provided separately from the die block 22. That is, they may be integrally formed with the die block 22.

Note that as shown in FIG. 3, a plurality of heat bolts 23 are arranged along the longitudinal direction of the lips 21a and 22a (in the y-axis direction). The longitudinal direction of the lips 21a and 22a corresponds to (i.e., substantially parallel to) the width direction of the resin film. Although only three heat bolts 23 are provided in the example shown in FIG. 3 for simplifying the drawing, the number of heat bolts 23 provided in the die block is usually larger than three.

One heater 24 is provided for each heat bolt 23 to heat that heat bolt 23. In the example shown in FIGS. 2 and 3, for each heat bolt 23, a heater 24 is provided so as to cover the outer peripheral surface of that heat bolt 23 between the holders 25a and 25b. It is possible, by tightening (i.e., screwing) the heat bolts 23, to push the lip 22a with the lower end surfaces of the heat bolts 23. Further, the lower ends of the heat bolts 23 are connected to the lip 22a by a connecting member 26 which has a U-shape in cross section and is fixed to the lip 22a. Therefore, by loosening (i.e., unscrewing) the heat bolts 23, the lip 22a can be pulled through the connecting member 26.

It is possible to adjust the distance between the lips 21a and 22a by adjusting the tightness of the heat bolts 23. Specifically, when the tightness of the heat bolts 23 are increased, the heat bolts 23 push the lip 22a, so that the distance between the lips 21a and 22a is reduced. On the other hand, when the tightness of the heat bolt 23 are reduced, the distance between the lips 21a and 22a is increased. For example, the tightness of the heat bolts 23 are manually adjusted.

Further, it is possible to finely adjust the distance between the lips 21a and 22a by the amounts of the thermal expansions (hereinafter also referred to as the thermal expansion amounts) of the heat bolts 23 caused by the heaters 24. Specifically, when the heating temperatures of the heaters 24 are raised, the thermal expansion amounts of the heat bolts 23 increase, so that the heat bolts 23 push the lip 22a and the distance between the lips 21a and 22a thereby is reduced. On the other hand, when the heating temperatures of the heaters 24 are lowered, the thermal expansion amounts of the heat bolts 23 decrease, so that the distance between the lips 21a and 22a is increased. The thermal expansion amount of each heat bolt 23, i.e., the heating by each heater 24 is controlled by the control unit 70.

<Configuration of Control Unit 70 According to Comparative Example>

A resin-film manufacturing apparatus according to a comparative example has an overall configuration similar to that of the resin-film manufacturing apparatus according to the first embodiment shown in FIG. 1. In the comparative example, the control unit 70 performs, by using PID control, feedback control for the heaters 24 of the respective heat bolts 23 based on the thickness distribution of the resin film 83 acquired from the thickness sensor 60. In the case of the PID control, it is necessary to adjust a parameter(s) every time a process condition(s) is changed. In general, an operator adjusts the parameter(s) through trial and error, thus causing a problem that a large amount of time is taken and a large amount of resin material is required to adjust the parameter(s).

<Configuration of Control Unit 70 According to First Embodiment>

Figure 4:
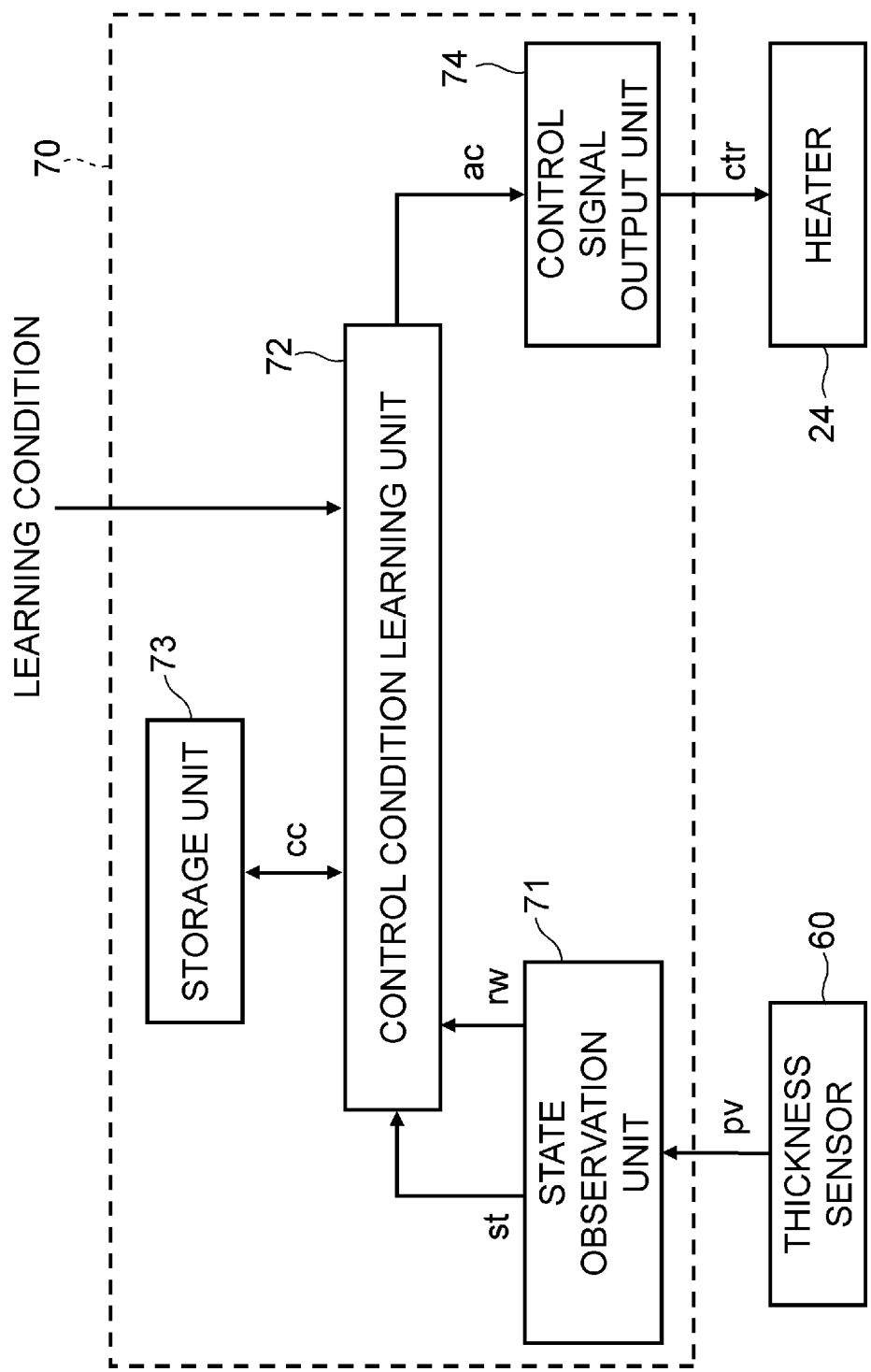
FIG. 4 is a block diagram showing a configuration of a control unit 70 according to the first embodiment.

Next, the configuration of the control unit 70 according to the first embodiment will be described in a more detailed manner with reference to FIG. 4. FIG. 4 is a block diagram showing the configuration of the control unit 70 according to the first embodiment. As shown in FIG. 4, the control unit 70 according to the first embodiment includes a state observation unit 71, a control condition learning unit 72, a storage unit 73, and a control signal output unit 74.

Note that each of the functional blocks constituting the control unit 70 can be implemented by hardware such as a CPU (Central Processing Unit), a memory, and other circuits, or can be implemented by software such as a program(s) loaded in a memory or the like. Therefore, each functional block can be implemented in various forms by computer hardware, software, or combinations thereof.

The state observation unit 71 calculates a control error of each heat bolt 23 from a measured value pv of the thickness distribution of the resin film 83 acquired from the thickness sensor 60. The control error is a difference between a target value and a measured value pv. Note that the target value is an average value of measured values pv of the thickness distribution of the resin film 83 measured in all the heat bolts 23 by the thickness sensor 60.

Note that when the average value of measured values pv is obtained, measured values measured at both ends of the resin film 83, which are not used as a product, may be excluded from those used to obtain the average value.

Meanwhile, the measured value pv of each heat bolt 23 is determined from a measured value pv of a thickness at a measuring point assigned to that heat bolt 23. For example, the measured value pv of each heat bolt 23 is an average value of measured values pv of a thickness at a measuring point assigned to that heat bolt 23. Alternatively, at a measurement point assigned to each heat bolt 23, a measured value pv of a thickness of which the difference from the target value is the largest may be used as the measured value pv of that heat bolt 23.

Further, the state observation unit 71 determines, for each heat bolt 23, a current state st and a reward rw for an action ac selected in the past (e.g., selected in the last time) based on the calculated control error.

The state st is defined in advance in order to classify values of the control error, which can take any of infinite number of values, into a finite number of groups. As a simple example for an explanatory purpose, when the control error is represented by err, for example, a range "$-0.9\ \mu m \leq err < -0.6\ \mu m$" is defined as a state st1; a range "$-0.6\ \mu m \leq err < -0.3\ \mu m$" is defined as a state st2; a range "$-0.3\ \mu m \leq err < 0.3\ \mu m$" is defined as a state st3; a range "$0.3\ \mu m \leq err < 0.6\ \mu m$" is defined as a state st4; and a range "$0.6\ \mu m \leq err < 0.9\ \mu m$" is defined as a state st5. In practice, in many cases, a larger number of states st each having a narrower range may be defined.

The reward rw is an index for evaluating an action ac that was selected in a past state st. Specifically, when the absolute value of the calculated current control error is smaller than the absolute value of the past control error, the state observation unit 71 determines that the action ac selected in the past is appropriate and sets, for example, a positive value to the reward rw. In other words, the reward rw is determined so that the previously selected action ac is more likely to be selected again in the same state st as the past state.

On the other hand, when the absolute value of the calculated current control error is larger than the absolute value of the past control error, the state observation unit 71 determines that the action ac selected in the past is inappropriate and sets, for example, a negative value to the reward rw. In other words, the reward rw is determined so that the previously selected action ac is less likely to be selected again in the same state st as the past state.

Note that specific examples of the reward rw will be described later. Further, the value of the reward rw can be determined as appropriate. For example, the reward rw may have a positive value at all times, or the reward rw may have a negative value at all times.

The control condition learning unit 72 performs reinforcement learning in regard to each heat bolt 23. Specifically, the control condition learning unit 72 updates a control condition (a learning result) based on the reward rw, and selects an optimum action ac corresponding to the current state st under the updated control condition. The control condition is a combination of a state st and an action ac. Table 1 shows simple control conditions (learning results) corresponding to the above-described states st1 to st5. In the example shown in FIG. 4, the control condition learning unit 72 stores the updated control condition cc in the storage unit 73, which is, for example, a memory, and updates the control condition cc by reading it from the storage unit 73.

TABLE 1

|  | st1<br>−0.9 to<br>−0.6 μm | st2<br>−0.6 to<br>−0.3 μm | st3<br>−0.3 to<br>+0.3 μm | st4<br>+0.3 to<br>+0.6 μm | st5<br>+0.6 to<br>+0.9 μm |
|---|---|---|---|---|---|
| ac1<br>−1% | +4.2 | +5.3 | +3.4 | −1.2 | −3.2 |
| ac2<br>0% | −1.3 | +4.3 | +3.6 | +0.1 | −1.2 |
| ac3<br>+1% | −5.2 | +1.0 | +4.2 | +5.4 | +7.4 |
| ac4<br>+1.5% | −10.2 | −6.5 | −1.0 | +5.6 | +9.7 |

The Table 1 shows control conditions (learning results) by Q learning, which is an example of the reinforcement learning. The aforementioned five states st1 to st5 are shown in the uppermost row in the Table 1. That is, the five states st1 to st5 are shown in the second to sixth columns, respectively. Meanwhile, four actions ac1 to ac4 are shown in the leftmost column in the Table 1. That is, the four actions ac1 to ac4 are shown in the second to fifth rows, respectively.

Note that, in the example shown in the Table 1, an action for reducing the output (e.g., the voltage) to the heater 24 by 1% is defined as the action ac1 (Output Change: −1%). An action for maintaining the output to the heater 24 is defined as the action ac2 (Output Change: 0%). An action for increasing the output to the heater 24 by 1% is defined as the action ac3 (Output Change: +1%). An action for increasing the output to the heater 24 by 1.5% is defined as the action ac4 (Output Change: +1.5%). The example shown in the Table 1 is merely a simple example for an explanatory purpose. That is, in practice, in many cases, a larger number of more detailed actions ac may be defined.

A value determined by a combination of a state st and an action ac in the Table 1 is called a quality Q (st, ac). After an initial value is given, the quality Q is successively updated based on the reward rw by using a known updating formula. The initial value of the quality Q is included in, for example, the learning condition shown in FIG. 4. The learning condition is input by, for example, an operator. The initial value of the quality Q may be stored in the storage unit 73, and for example, a learning result in the past may be used as the initial value. Further, for example, the states st1 to st5 and the actions ac1 to ac4 shown in the Table 1 are included in the learning condition shown in FIG. 4.

The quality Q will be described by using the state st4 in the Table 1 as an example. In the state st4, since the control error is no smaller than 0.3 μm and smaller than 0.6 μm, the lip distance in the place corresponding to the target heat bolt 23 is too wide. Therefore, it is necessary to increase the output to the heater 24 that heats the target heat bolt 23 and thereby to increase the thermal expansion amount of the target heat bolt 23. Therefore, as a result of the learning by the control condition learning unit 72, the qualities Q of the actions ac3 and ac4 for increasing the output to the heater 24 are larger. Meanwhile, the qualities Q of the action ac2 for maintaining the output to the heater 24 and the action ac1 for reducing the output to the heater 24 are small.

In the example shown in the Table 1, for example, when the control error is 0.4 μm, the state st falls in the state st4. Therefore, the control condition learning unit 72 selects the optimum action ac4 having the maximum quality Q in the state st4, and outputs the selected action ac4 to the control signal output unit 74. The control signal output unit 74 increases a control signal ctr output to the heater 24 by 1.5% based on the action ac4 received from the control condition learning unit 72. The control signal ctr is, for example, a voltage signal.

Then, when the absolute value of the next control error is smaller than the absolute value 0.4 μm of the current control error, the state observation unit 71 determines that the selecting of the action ac4 in the current state st4 is appropriate, and outputs a reward rw having a positive value. Therefore, the control condition learning unit 72 updates the control condition so as to increase the quality +5.6 of the action ac4 in the state st4 according to the reward rw. As a result, in the case of the state st4, the control condition learning unit 72 continuously selects the action ac4.

On the other hand, when the absolute value of the next control error is larger than the absolute value 0.4 μm of the current control error, the state observation unit 71 determines that the selecting of the action ac4 in the current state st4 is inappropriate, and outputs a reward rw having a negative value. Therefore, the control condition learning unit 72 updates the control condition so as to reduce the quality +5.6 of the action ac4 in the state st4 according to the reward rw. As a result, in the case of the state st4, when the quality of the action ac4 in the state st4 becomes smaller than the quality +5.4 of the action ac3, the control condition learning unit 72 selects the action ac3 instead of the action ac4.

Note that the timing of the updating of the control condition is not limited to the next time (e.g., not limited to when the control error is calculated the next time). That is, the timing of the updating may be determined as appropriate while taking a time lag or the like into consideration. Further, in the initial stage of the learning, the action ac may be randomly selected in order to expedite the learning. Further, although the reinforcement learning by simple Q learning is described above with reference to the Table 1, there are various types of learning algorithms such as Q learning, AC (Actor-Critic) method, TD learning, and Monte Carlo method, and the learning algorithm is not limited to in any type of algorithms. For example, when the number of states st and actions ac increase and the number of combinations thereof explosively increases, the algorithm may be selected, such as using the AC method, according to the situation.

Further, in the AC method, a probability distribution function is used as a policy function in many cases. The probability distribution function is not limited to the normal distribution function. For example, for the purpose of simplification, a sigmoid function, a soft max function, or the like may be used. The sigmoid function is a function that is used most commonly in neural networks. Because the reinforcement learning is one of the types of the machine learning that is the same as the neural network, it can use the sigmoid function. Further, the sigmoid function has another advantage that the function itself is simple and easily handled.

As described above, there are various learning algorithms and functions to be used, and an optimum algorithm and an optimum function may be selected as appropriate for the process.

As described above, the PID control is not used in the resin-film manufacturing apparatus according to the first embodiment. Therefore, to begin with, there is no need to adjust a parameter(s) which would otherwise be necessary when a process condition is changed. Further, the control unit 70 updates the control condition (the learning result) based on the reward rw through the reinforcement learning, and selects an optimum action ac corresponding to the current state st under the updated control condition. Therefore, even when a process condition(s) is changed, it is possible reduce the time taken for the adjustment and the amount of a resin material required therefor as compared to those in the comparative example.

<Control Method for Resin-Film Manufacturing Apparatus>

Figure 5:
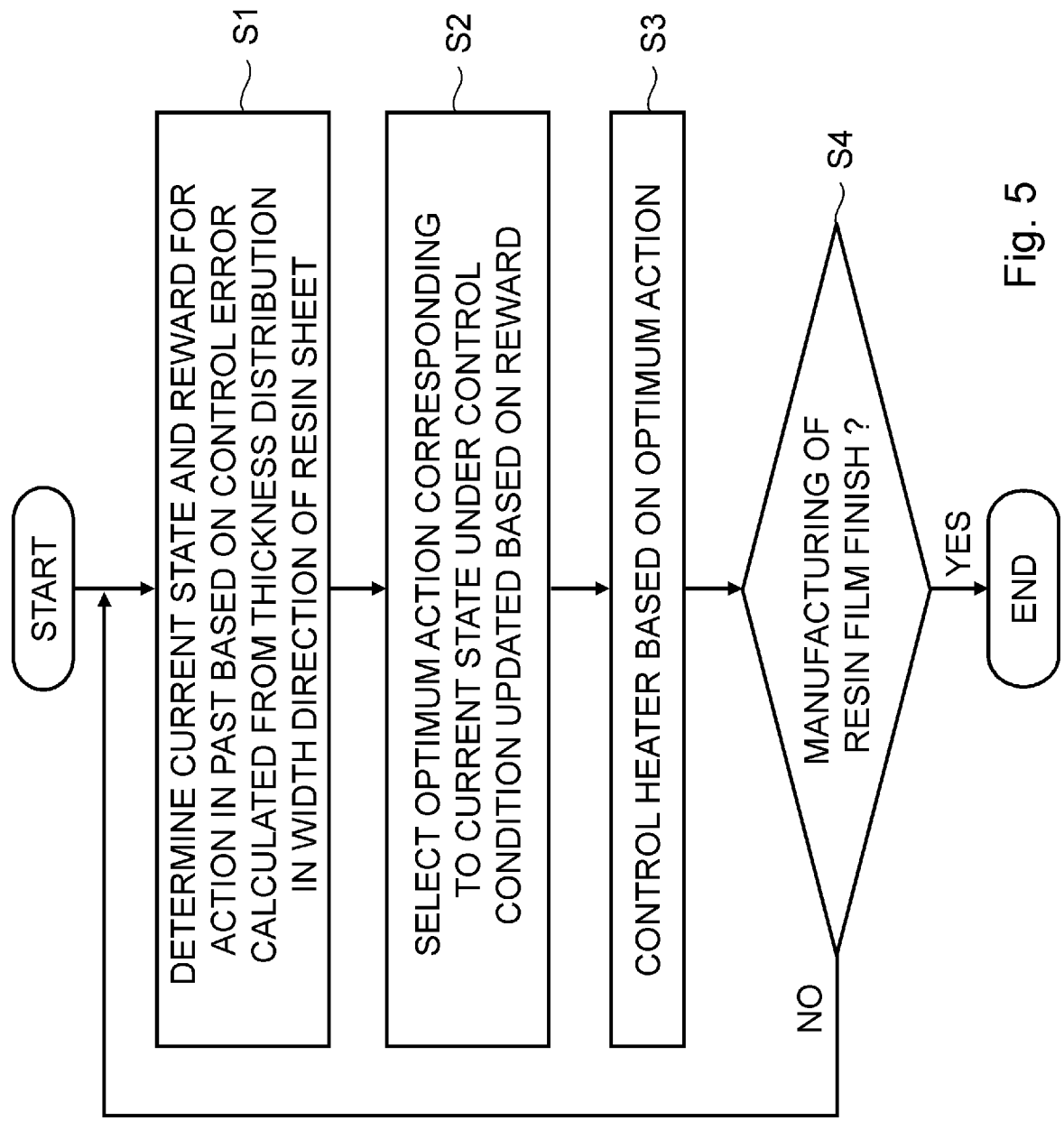
FIG. 5 is a flowchart showing a method for controlling the resin-film manufacturing apparatus according to the first embodiment.

Next, a method for controlling the resin-film manufacturing apparatus according to the first embodiment will be described in detail with reference to FIG. 5. FIG. 5 is a flowchart showing a method for controlling the resin-film manufacturing apparatus according to the first embodiment. The following description will be given while referring to FIG. 4 as appropriate as well as referring to FIG. 5.

Firstly, as shown in FIG. 5, the state observation unit 71 of the control unit 70 shown in FIG. 4 calculates, for each heat bolt 23, a control error from the thickness distribution of the resin film 83. Then, based on the calculated control error, the state observation unit 71 determines a current state st and a reward rw for an action ac selected in the past (Step S1). Note that, at the start of the control, since there is no action ac selected in the past (e.g., no action ac selected in the last control) and hence it is impossible to determine the reward rw. Therefore, only the current state st at the start of the control is determined.

Next, the control condition learning unit 72 of the control unit 70 updates a control condition, which is a combination of a state st and an action ac, based on the reward rw. Then, the control condition learning unit 72 selects an optimum action ac corresponding to the current state st under the updated control condition (Step S2). Note that, at the start of the control, the control condition is not updated and remains as the initial value, but the optimum action ac corresponding to the state st at the start of the control is selected.

Then, the control signal output unit 74 of the control unit 70 outputs a control signal ctr to the heater 24 based on the optimum action ac selected by the control condition learning unit 72 (Step S3).

When the manufacturing of the resin film 83 has not been completed yet (Step S4 No), the process returns to the step S1 and the control is continued. On the other hand, when the manufacturing of the resin film 83 has been completed (Step S4 YES), the control is finished. That is, the steps S1 to S3 are repeated until the manufacturing of the resin film 83 is completed.

As described above, the PID control is not used in the resin-film manufacturing apparatus according to the first embodiment. Therefore, to begin with, there is no need to adjust a parameter(s) which would otherwise be necessary when a process condition(s) is changed. Further, the control condition (the learning result) is updated based on the reward rw through the reinforcement learning using a computer, and an optimum action ac corresponding to the current state st is selected under the updated control condition. Therefore, even when a process condition(s) is changed, it is possible reduce the time taken for the adjustment and the amount of the resin material required therefor as compared to those in the comparative example.

<Method for Setting Initial Value of Control Condition>

Figure 6:
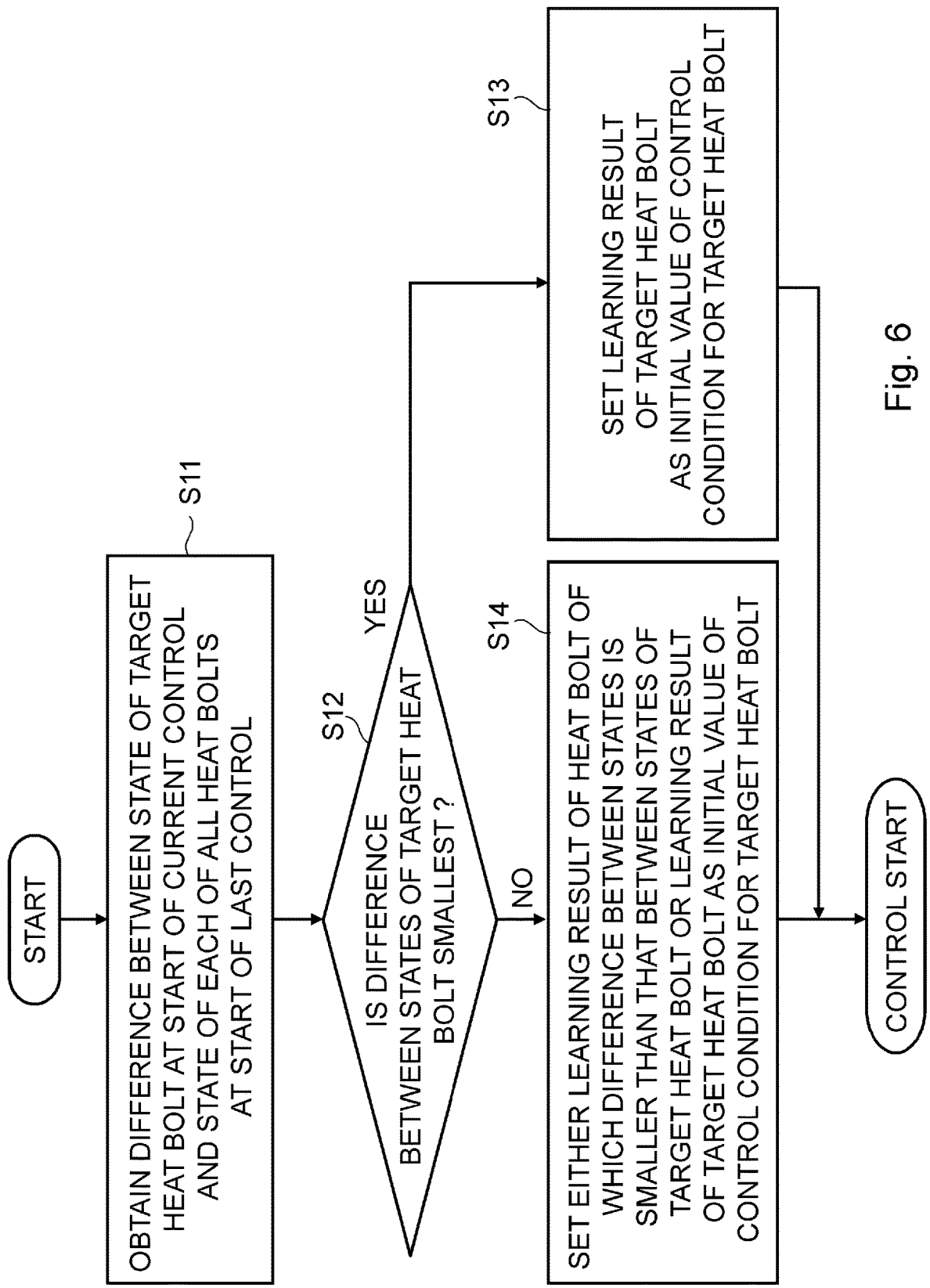
FIG. 6 is a flowchart showing a method for setting an initial value of a control condition at the start of control in the resin-film manufacturing apparatus according to the first embodiment.

Next, a method for setting an initial value of a control condition at the start of control in the resin-film manufacturing apparatus according to the first embodiment will be described with reference to FIG. 6. FIG. 6 is a flowchart showing a method for setting an initial value of a control condition at the start of control in the resin-film manufacturing apparatus according to the first embodiment. FIG. 6 shows a case where a control condition (a learning result) which was learned during the last control is set (i.e., used) as an initial value of the current control condition.

Note that when the control is performed for the first time, there is no learning result. Therefore, the initial value of the control condition is set as appropriate.

In the resin-film manufacturing apparatus according to this embodiment, the learning results of other heat bolts 23 as well as the learning result of the target heat bolt 23 are used as the initial value of the control condition of the target heat bolt 23.

Figure 7:
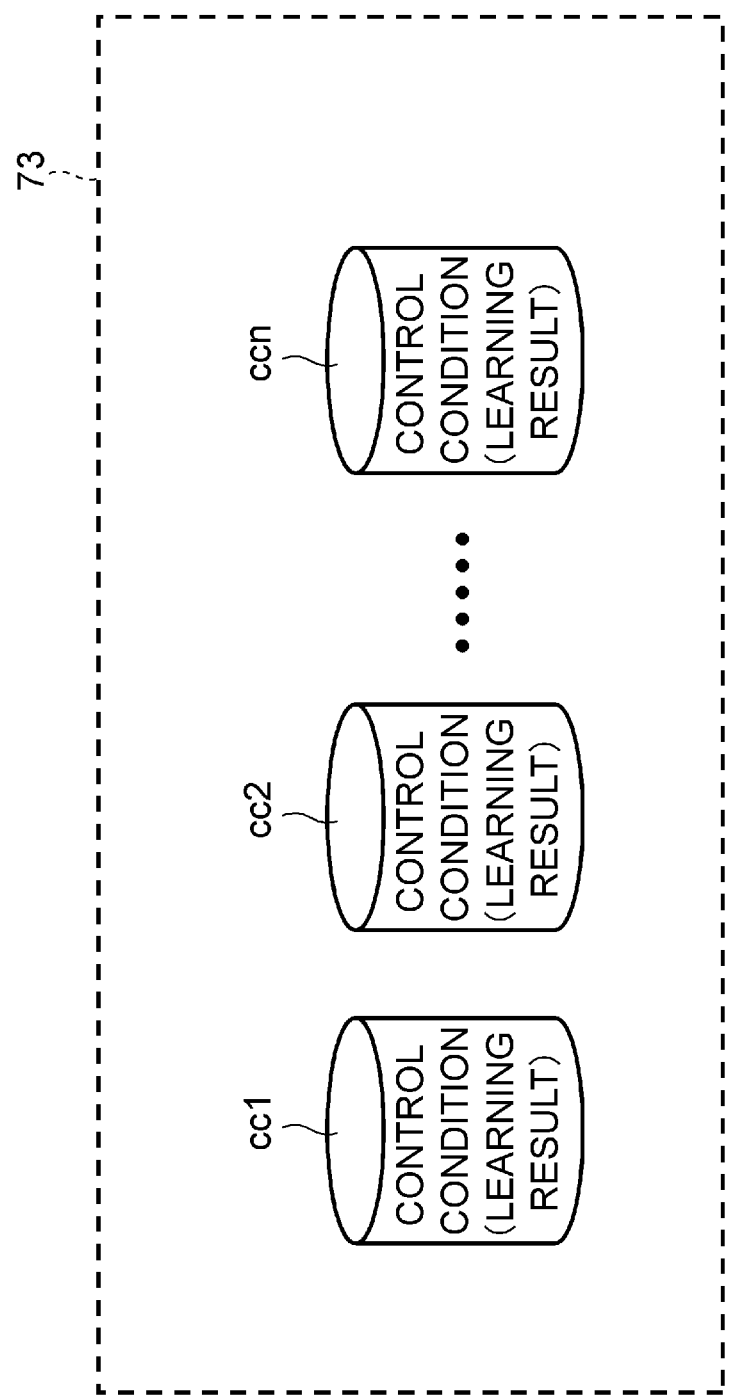
FIG. 7 is a block diagram schematically showing a storage unit 73.

Here, FIG. 7 is a block diagram schematically showing the storage unit 73. As shown in FIG. 7, the storage unit 73 stores control conditions (learning results) cc1 to ccn that were learned in the last control for n heat bolts 23, respectively.

As shown in FIG. 6, the control unit 70 obtains, for each heat bolt 23, a difference between a state st of the target heat bolt 23 at the start of the current control (i.e., the control to start from now on) and a state st of each of all the heat bolts 23 at the start of the last control (Step S11). As described above, the state st at the start of the current control is also determined from the control error calculated by the state observation unit 71. The state st at the start of the last control is stored, for example, in the storage unit 73.

Note that the difference between the state st of the target heat bolt 23 at the start of the current control and the state st thereof at the start of the last control is hereinafter referred to as "the difference between the states st of the target heat bolt 23". When the difference between the states st of the target heat bolt 23 is the smallest one (Step S12 YES), the learning result of the target heat bolt 23 is set (i.e., used) as the initial value of the control condition for the target heat bolt 23 (Step S13). Note that when there are a plurality of heat bolts 23 of each of which the difference between the states st is the smallest, the learning result of the target heat bolt 23 is selected.

Note that it is meant that the smaller the difference between the states st of a heat bolt 23 is, the closer the state st of that heat bolt 23 at the start of the last control is to the state st of the target heat bolt 23 at the start of the current control. By using such learning result of a heat bolt 23, it is possible to efficiently learn the control condition and to reduce the convergence time.

After the step S13, the control (the learning) is started.

On the other hand, when the difference between the states st of the target heat bolt 23 is not the smallest one (Step S12 No), either one of the learning result of the heat bolt 23 of which the difference between the states st is smaller than the difference between the states of the target heat bolt 23 and the learning result of the target heat bolt 23 is set (i.e., used) as the initial value of the control condition for the target heat bolt 23 (Step S14).

For example, in the step S14, the learning result of the heat bolt 23 of which the difference between the states st is the smallest one is simply set as the initial value of the control condition for the target heat bolt 23.

Alternatively, a distance from the target heat bolt 23 may be taken into consideration in addition to the difference between states st. For example, when there are a plurality of heat bolts 23 of each of which the difference between the states st is the smallest, the learning result of the heat bolt 23 located closest to the target heat bolt 23 is used as the initial value of the control condition for the target heat bolt 23.

As another specific example, assume a case where: a heat bolt 23 of which the difference between the states st is the smallest one is distant from the target heat bolt 23; a heat bolt 23 of which the difference between the states st is the second smallest is located closer to the target heat bolt 23; and the difference between the states st of the target heat bolt 23 is the second smallest. In such a case, any of the learning results of these three heat bolts 23 may be used. For example, it is possible select one of these three heat bolts 23 by using, as appropriate, a calculation formula in which the difference between the states st and the distance to the target heat bolt are taken into consideration.

After the step S14, the control (the learning) is started.

As described above, in the resin-film manufacturing apparatus according to this embodiment, the learning results of other heat bolts 23 as well as the learning result of the target heat bolt 23 are used as the initial value of the control condition for the target heat bolt 23. Specifically, a difference between a state st of the target heat bolt 23 at the start of the current control and a state st of each of all the heat bolts 23 at the start of the last control is obtained. Then, the initial value of the control condition for the target heat bolt 23 is set based on the learning result of a heat bolt of which the difference between the states st is small. Therefore, it is possible to efficiently learn the control condition and to reduce the convergence time as compared to the case where only the learning results of the heat bolts 23 are used as the initial value of the control condition for the target heat bolt 23.

Second Embodiment

Next, a resin-film manufacturing apparatus according to a second embodiment will be described with reference to FIG. 8. The overall configuration of the resin-film manufacturing apparatus according to the second embodiment is similar to that of the resin-film manufacturing apparatus according to the first embodiment shown in FIGS. 1 to 3, and therefore the description thereof will be omitted. The configuration of the control unit 70 in the resin-film manufacturing apparatus according to the second embodiment differs from that in the resin-film manufacturing apparatus according to the first embodiment.

Figure 8:
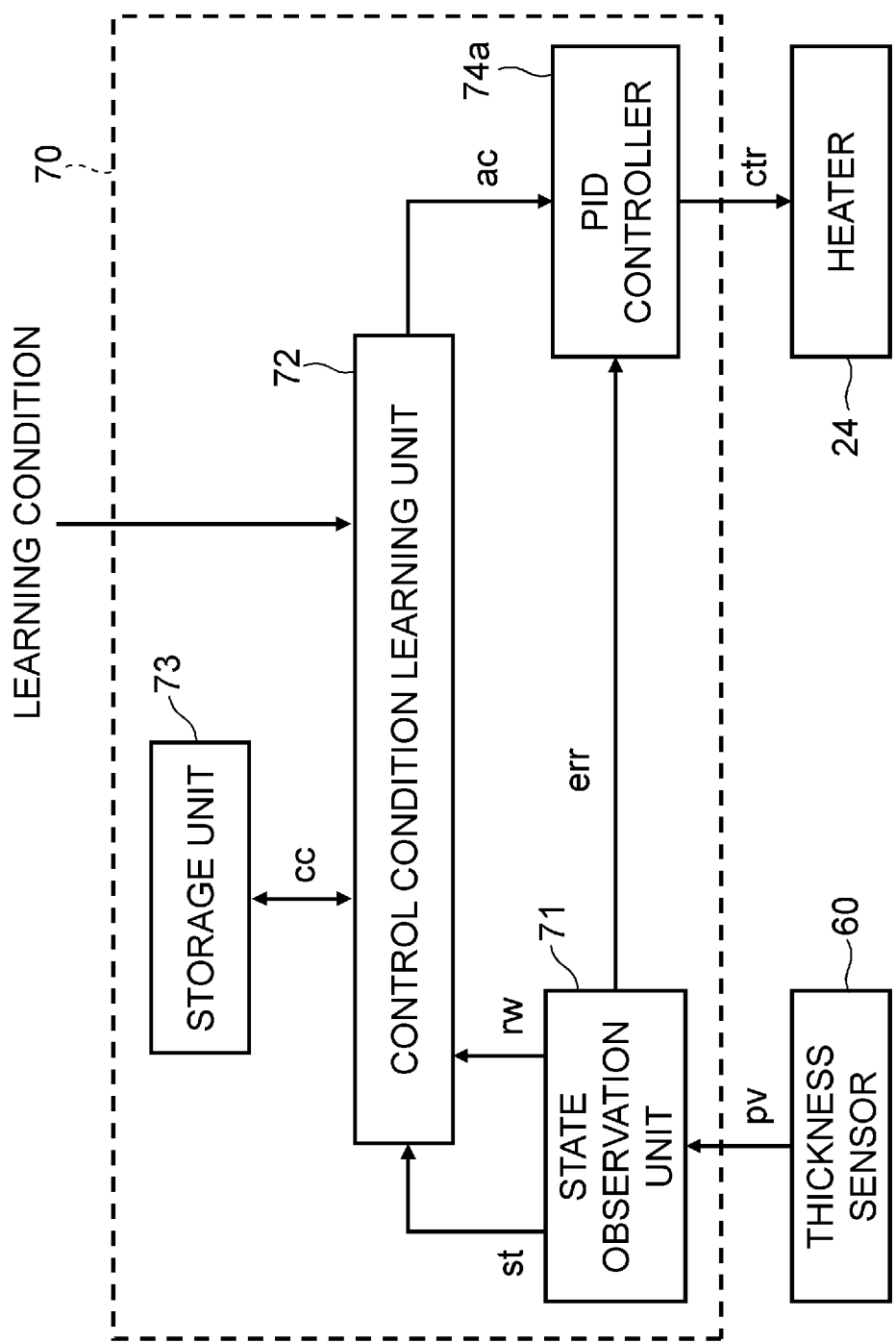
FIG. 8 is a block diagram showing a configuration of a control unit 70 according to a second embodiment.

FIG. 8 is a block diagram showing the configuration of the control unit 70 according to the second embodiment. As shown in FIG. 8, the control unit 70 according to the second embodiment includes a state observation unit 71, a control condition learning unit 72, a storage unit 73, and a PID controller 74a. That is, the control unit 70 according to the second embodiment includes the PID controller 74a as the control signal output unit 74 in the control unit 70 according to the first embodiment shown in FIG. 4. The PID controller 74a is also an example of the control signal output unit.

Similarly to the first embodiment, the state observation unit 71 determines, for each heat bolt 23, a current state st and a reward rw for an action ac selected in the past based on the calculated control error err. Then, the state observation unit 71 outputs the current state st and the reward rw to the control condition learning unit 72. Further, the state observation unit 71 according to the second embodiment outputs the calculated control error err to the PID controller 74a.

Similarly to the first embodiment, the control condition learning unit 72 also performs reinforcement learning for each heat bolt 23. Specifically, the control condition learning unit 72 updates a control condition (a learning result) based on the reward rw, and selects an optimum action ac corresponding to the current state st under the updated control condition. Note that, in the first embodiment, the output to the heater 24 is directly changed according to the content (i.e., the details) of the action ac selected by the control condition learning unit 72. In contrast, in the second embodiment, a parameter(s) of the PID controller 74a is changed according to the content (e.g., the details) of the action ac selected by the control condition learning unit 72.

As shown in FIG. 8, the parameter of the PID controller 74a is successively changed based on the action ac output from the control condition learning unit 72. Meanwhile, the PID controller 74a outputs a control signal ctr to the heater 24 based on the control error err received from the control condition learning unit 72. The control signal ctr is, for example, a voltage signal.

The rest of the configuration is similar to that of the first embodiment, and therefore the description thereof will be omitted.

As described above, in the resin-film manufacturing apparatus according to the second embodiment, PID control is used, so that it is necessary to adjust a parameter(s) when a process condition(s) is changed. In the resin-film manufacturing apparatus according to the second embodiment, the control unit 70 updates the control condition (the learning result) based on the reward rw through the reinforcement learning, and selects an optimum action ac corresponding to the current state st under the updated control condition. Note that the action ac in the reinforcement learning is to change a parameter of the PID controller 74a. Therefore, even when a process condition(s) is changed, it is possible to reduce the time taken for the adjustment of the parameter and the amount of a resin material required therefor as compared to those in the comparative example.

The program includes instructions (or software codes) that, when loaded into a computer, cause the computer to perform one or more of the functions described in the embodiments. The program may be stored in a non-transitory computer readable medium or a tangible storage medium. By way of example, and not a limitation, non-transitory computer readable media or tangible storage media can include a random-access memory (RAM), a read-only memory (ROM), a flash memory, a solid-state drive (SSD) or other types of memory technologies, a CD-ROM, a digital versatile disc (DVD), a Blu-ray disc or other types of optical disc storage, and magnetic cassettes, magnetic tape, magnetic disk storage or other types of magnetic storage devices. The program may be transmitted on a transitory computer readable medium or a communication medium. By way of example, and not a limitation, transitory computer readable media or communication media can include electrical, optical, acoustical, or other forms of propagated signals.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. A resin-film manufacturing apparatus comprising:
    a die comprising a plurality of heat bolts arranged along a longitudinal direction of a pair of lips, and a plurality of heaters configured to heat these heat bolts, the die being configured so that a distance between the lips can be adjusted by each of the heat bolts;
    a cooling roll configured to discharge a resin film while cooling a film-like molten resin extruded from a gap between the pair of lips, the resin film being a film that is formed as the molten resin is solidified;

a thickness sensor configured to measure a distribution of thicknesses of the resin film discharged from the cooling roll in a width direction thereof;

a control unit configured to learn, for each of the heat bolts, a control condition of the heater while performing feedback control for the distance between the lips by controlling the heater based on a control error calculated from the distribution of thicknesses; and a storage unit configured to store, as a learning result, the control condition learned for each of the heat bolts, wherein when the control unit starts the control of the distance between the lips, for each of the heat bolts, the control unit performs the steps of:

determining a difference between a state of a target heat bolt at a start of current control and a state of each of all the heat bolts at a start of last control;

setting the learning result of the target heat bolt as an initial value of the current control condition for the target heat bolt when the difference between the states of the target heat bolt at the starts of the current and last control is a smallest one; and setting either one of a learning result of a heat bolt of which the difference between the states is smaller than the difference between the states of the target heat bolt and the learning result of the target heat bolt as the initial value of the current control condition for the target heat bolt when the difference between the states of the target heat bolt is not the smallest one.

2. The resin-film manufacturing apparatus according to claim 1, wherein when the difference between the states of the target heat bolt is not the smallest one, the learning result of a heat bolt of which the difference between the states is the smallest one is set as the initial value of the control condition for the target heat bolt.

3. The resin-film manufacturing apparatus according to claim 2, wherein when there are a plurality of heat bolts of each of which the difference between the states is the smallest, the learning result of a heat bolt located closest to the target heat bolt is set as the initial value of the control condition for the target heat bolt.

4. The resin-film manufacturing apparatus according to claim 1, wherein the control condition is a combination of a state and an action, the control unit performs:

determining a current state and the reward for an action selected in the past based on the control error;

updating the control condition based on the reward, and selecting an optimum action corresponding to the current state under the updated control condition; and controlling the heater based on the optimum action.

5. The resin-film manufacturing apparatus according to claim 4, wherein the action is to change an output of the heater.

6. The resin-film manufacturing apparatus according to claim 4, wherein the action is to change a parameter of a Proportional-Integral-Derivative (PID) controller configured to control an output of the heater.

7. A method for controlling a resin-film manufacturing apparatus, the resin-film manufacturing apparatus comprising:

a die comprising a plurality of heat bolts arranged along a longitudinal direction of a pair of lips, and a plurality of heaters configured to heat these heat bolts, the die being configured so that a distance between the lips can be adjusted by each of the heat bolts;

a cooling roll configured to discharge a resin film while cooling a film-like molten resin extruded from a gap between the pair of lips, the resin film being a film that is formed as the molten resin is solidified; and a thickness sensor configured to measure a distribution of thicknesses of the resin film discharged from the cooling roll in a width direction thereof, wherein a computer performs the steps of:

(a) learning, for each of the heat bolts, a control condition of the heater while performing feedback control for the distance between the lips by controlling the heater based on a control error calculated from the measured distribution of thicknesses; and (b) storing, as a learning result, the control condition learned for each of the heat bolts, and wherein in the step (a), when the computer starts the control of the distance between the lips, for each of the heat bolts, the computer performs:

(a1) determining a difference between a state of a target heat bolt at a start of current control and a state of each of all the heat bolts at a start of last control;

(a2-1) setting the learning result of the target heat bolt as an initial value of the current control condition for the target heat bolt when the difference between the states of the target heat bolt at the starts of the current and last control is a smallest one; and (a2-2) setting either one of a learning result of a heat bolt of which the difference between the states is smaller than the difference between the states of the target heat bolt and the learning result of the target heat bolt as the initial value of the current control condition for the target heat bolt when the difference between the states of the target heat bolt is not the smallest one.

8. The method for controlling a resin-film manufacturing apparatus according to claim 7, wherein in the step (a2-2), when the difference between the states of the target heat bolt is not the smallest one, the learning result of a heat bolt of which the difference between the states is the smallest one is set as the initial value of the control condition for the target heat bolt.

9. The method for controlling a resin-film manufacturing apparatus according to claim 8, wherein when there are a plurality of heat bolts of each of which the difference between the states is the smallest, the learning result of a heat bolt located closest to the target heat bolt is set as the initial value of the control condition for the target heat bolt.

10. The method for controlling a resin-film manufacturing apparatus according to claim 7, wherein the control condition is a combination of a state and an action, in the step (a), for each of the heat bolts, the computer performs:

(a3) determining a current state and the reward for an action selected in the past based on the control error;

(a4) updating the control condition based on the reward, and selecting an optimum action corresponding to the current state under the updated control condition; and (a5) controlling the heater based on the optimum action.

11. The method for controlling a resin-film manufacturing apparatus according to claim 10, wherein the action selected in the step (a4) is to change an output of the heater.

12. The method for controlling a resin-film manufacturing apparatus according to claim 10, wherein the action selected in the step (a4) is to change a parameter of a Proportional-Integral-Derivative (PID) controller configured to control an output of the heater.

* * * * *